United States Patent
Immig

(10) Patent No.: US 12,158,134 B2
(45) Date of Patent: Dec. 3, 2024

(54) ENERGY CONVERSION DEVICE AND ENERGY CONVERSION ARRANGEMENT

(71) Applicant: Mario Immig, Bad Kreuznach (DE)

(72) Inventor: Mario Immig, Bad Kreuznach (DE)

(73) Assignee: Mario Immig, Bad Kreuznach (DE)

( * ) Notice: Subject to any disclaimer, the term of this patent is extended or adjusted under 35 U.S.C. 154(b) by 0 days.

(21) Appl. No.: 17/856,708

(22) Filed: Jul. 1, 2022

(65) Prior Publication Data
US 2023/0010401 A1 Jan. 12, 2023

(30) Foreign Application Priority Data
Jul. 9, 2021 (EP) ..................................... 21184856

(51) Int. Cl.
| F03B 13/22 | (2006.01) |
| F03B 3/04 | (2006.01) |
| F03B 13/26 | (2006.01) |

(52) U.S. Cl.
CPC ................. *F03B 13/22* (2013.01); *F03B 3/04* (2013.01); *F03B 13/268* (2013.01); *F05B 2220/32* (2013.01); *F05B 2220/706* (2013.01); *F05B 2240/14* (2013.01); *F05B 2240/911* (2013.01)

(58) Field of Classification Search
CPC .......... F03B 13/22; F03B 3/04; F03B 13/268; F05B 2220/32; F05B 2220/706; F05B 2240/14; F05B 2240/911
See application file for complete search history.

(56) References Cited

U.S. PATENT DOCUMENTS

| 1,345,022 | A | * | 6/1920 | Oliver | ....................... F03D 1/04 |
| | | | | | 415/36 |
| 4,616,974 | A | * | 10/1986 | Andruszkiw | ............. F03D 7/02 |
| | | | | | 415/75 |
| 2007/0048086 | A1 | * | 3/2007 | Thorsbakken | ............ E02B 9/08 |
| | | | | | 405/75 |
| 2011/0194927 | A1 | | 8/2011 | DeMontmorency | |
| 2017/0082086 | A1 | * | 3/2017 | Mulvey | ................... F03B 13/10 |
| 2018/0291581 | A1 | * | 10/2018 | Duquette | ................ F03B 15/04 |
| 2019/0234369 | A1 | * | 8/2019 | Dien | ..................... F03B 13/147 |
| 2019/0271293 | A1 | * | 9/2019 | Carter | .................. H02K 7/1823 |

FOREIGN PATENT DOCUMENTS

| DE | 10 2006 006 260 A1 | 8/2007 |
| DE | 10 2007 057 267 A1 | 11/2008 |
| DE | 20 2010 006 722 U1 | 8/2010 |
| FR | 1.011.132 | 6/1952 |
| GB | 2 001 396 A | 1/1979 |
| JP | 58-178881 A | 10/1983 |

OTHER PUBLICATIONS

European Office Action for Application No. EP 21 184 856.9 dated Nov. 29, 2022, 5 pages.
European Office Action for Application No. EP 21 184 856.9 dated Mar. 10, 2023, 6 pages.
Extended European Search Report for EP Application No. 21 184 856.9 dated Nov. 25, 2021, 6 pgs.

\* cited by examiner

*Primary Examiner* — Viet P Nguyen
(74) *Attorney, Agent, or Firm* — Seed IP Law Group LLP

(57) ABSTRACT

An energy conversion device for converting water energy, in some cases water energy from waves and/or a flow such as an ocean current, into electric energy, comprises at least one rotor having a rotor rotational axis, the alignment of which is in some cases fixed by a supporting frame, and a flow housing which comprises a rotor shell which surrounds the rotor radially to the rotor rotational axis.

20 Claims, 7 Drawing Sheets

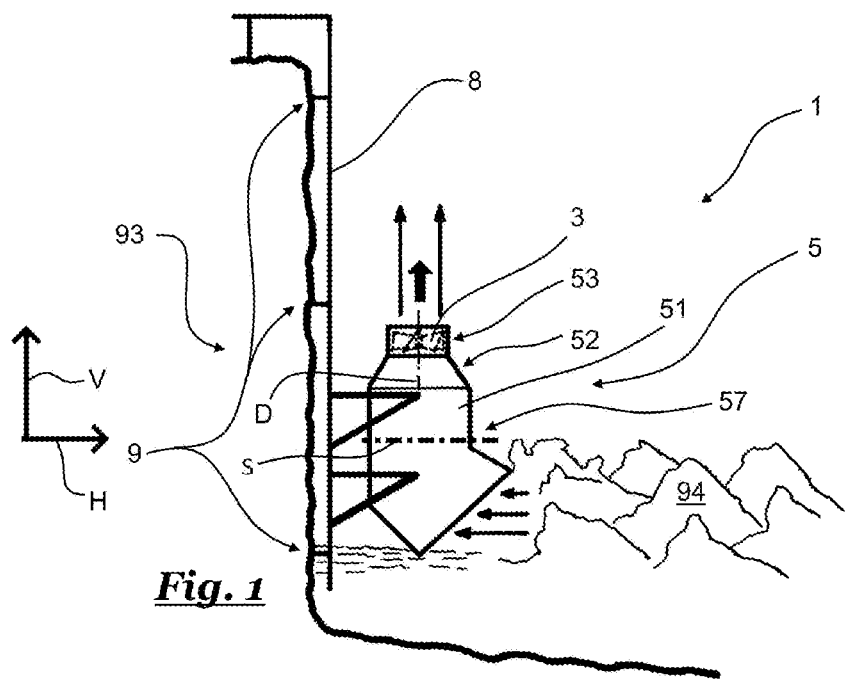
*Fig. 1*
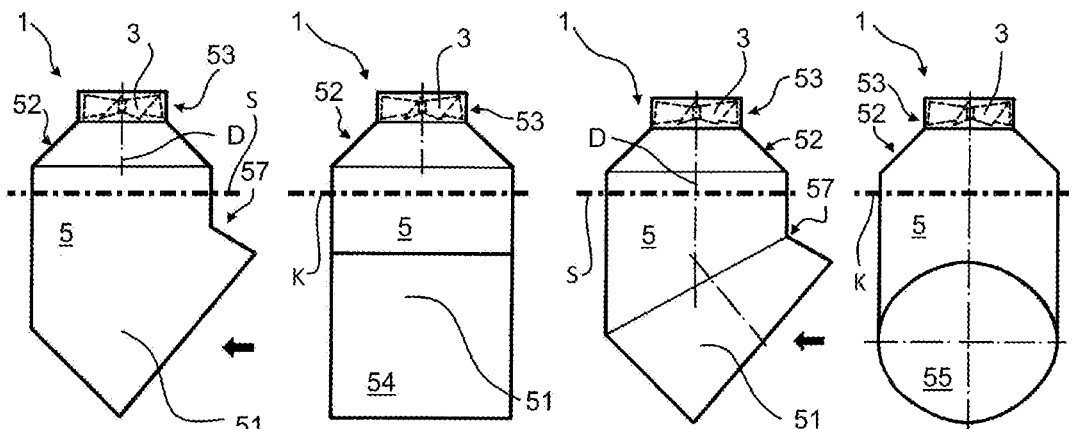
*Fig. 2a*  *Fig. 2b*  *Fig. 3a*  *Fig. 3b*
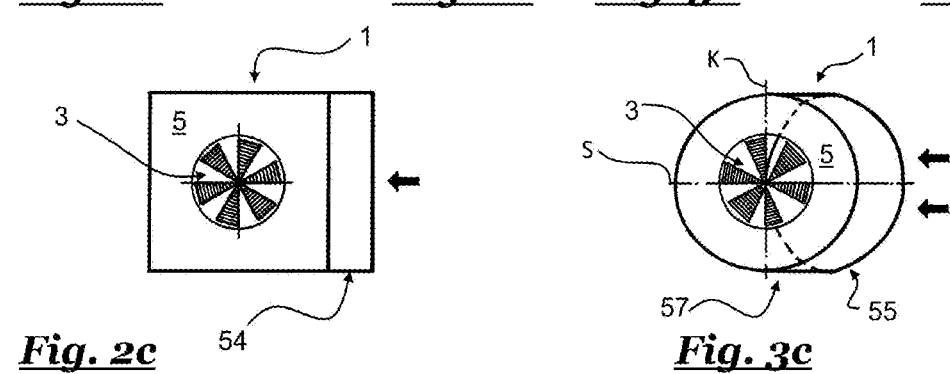
*Fig. 2c*  *Fig. 3c*

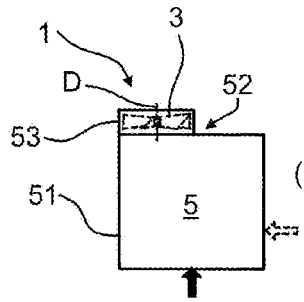
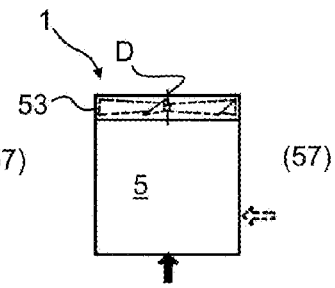
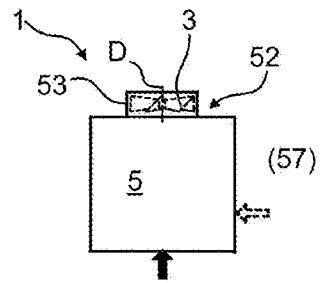
Fig. 11   Fig. 12   Fig. 13
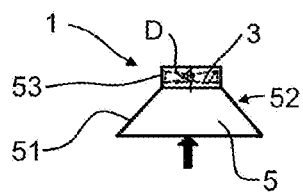
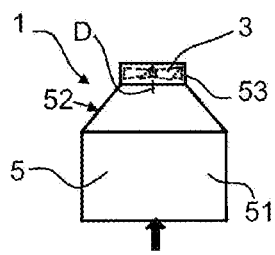
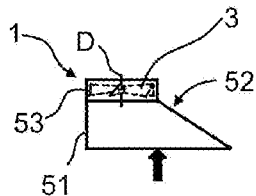
Fig. 14   Fig. 15   Fig. 16
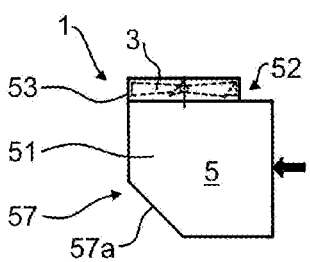
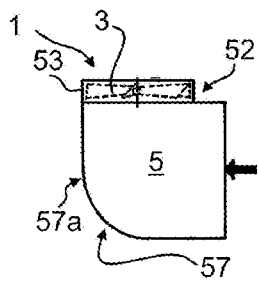
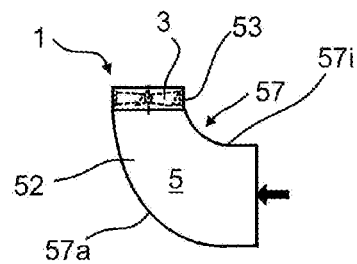
Fig. 17   Fig. 18   Fig. 19
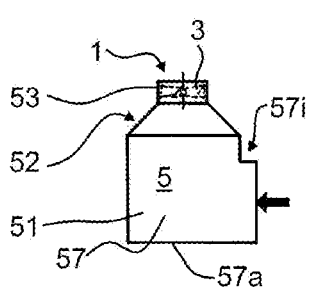
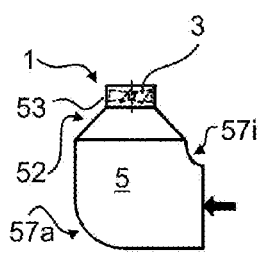
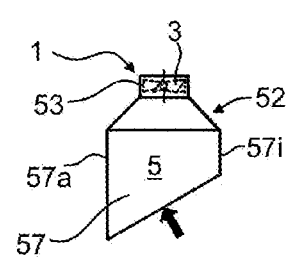
Fig. 20   Fig. 21   Fig. 22

ENERGY CONVERSION DEVICE AND ENERGY CONVERSION ARRANGEMENT

BACKGROUND

Technical Field

The present disclosure relates to an energy conversion device for converting water energy, in some cases water energy from waves and/or a flow, such as an ocean current, into electric energy. The present disclosure further relates to an energy conversion arrangement having several energy conversion devices.

Description of the Related Art

To date, there have not been any hydroelectric power plants which can harness strong currents and/or high waves in order to generate electricity with little outlay. In some cases, steep rock faces by the sea, against which high waves strike, are not considered to be a suitable location for generating electricity.

Thus, there is accordingly a need to provide an energy conversion device for converting water energy into electric energy, which overcomes the disadvantages of the prior art. There is further a need to provide an energy conversion device which provides an efficient conversion of water energy. In some cases there is further a need to provide an energy conversion device which is suitable for extracting electric energy from strong currents and/or high waves. Alternatively or additionally, there is a need to provide an energy conversion device which is location-independent and/or which can be deployed at any installation site. In some cases, there is further a need to provide an energy conversion device of any size. In some other cases there is a need to provide an energy conversion device which is easily feasible for anyone, such as laymen, untrained users and private users. Furthermore, in some even other cases there is a need to provide an energy conversion system which can be produced and/or which is to be operated in an environmentally friendly manner.

BRIEF SUMMARY

Accordingly, the present disclosure provides an energy conversion device for converting water energy into electric energy, which comprises at least one rotor and a flow housing. In some cases, the energy conversion device is provided for converting water energy from waves into electric energy. Alternatively or additionally, the energy conversion device can be provided for converting water energy of a flow, such as an ocean current, into electric energy. In contrast to conventional offshore wind power plants, the energy conversion device according to the present disclosure makes it possible to extract energy constantly around the clock. Unlike wind which occasionally ceases or wind which blows too strongly for conventional wind power plants, waves and water currents, such as ocean currents, are constantly available regardless of the weather.

The at least one rotor has a rotor rotational axis, the alignment of which is fixed. In some cases, the alignment of the rotor rotational axis is fixed by a supporting frame. In some further cases the rotor is fixed to the supporting frame by a mechanical connection. The fixing of the rotor determines the alignment of the rotor rotational axis. It is clear that the rotor can be rotated; the fixing of the rotor, for example to the supporting frame, supports the basic functionality of the rotor and does not adversely affect it. In order to fix the rotor to the supporting frame, known mechanical devices such as radial bearings, axial bearings and/or plain bearings can be provided. The at least one rotor can comprise several rotor blades extending radially to the rotor rotational axis. In some cases, the rotor is adapted and arranged to harness power or electric energy as so-called "blue energy" from the inexhaustible energy source in the form of water in the sea or other moving bodies of water with the aid of the resistance principle. It is clear that the term rotor in the present disclosure comprises impellers and/or turbines and the like, which are adapted and arranged to capture water energy and to transfer it into a rotational movement for conversion into electric energy, in some cases by means of a generator.

The flow housing comprises a rotor mantle which surrounds the rotor radially to the rotor rotational axis. In some cases, the rotor mantle fully surrounds the rotor. In some further cases, the rotor mantle is tubular. In some even further cases, the rotor mantle completely surrounds the area spanned by the rotor blades of the rotor, in some cases without contact. In some cases, the flow housing is adapted and arranged to guide the water moving in the flow housing in order to drive the rotor, in some cases according to the resistance principle.

BRIEF DESCRIPTION OF THE SEVERAL VIEWS OF THE DRAWINGS

Further features and advantages of the present disclosure are set out by the following description, in which embodiments of the present disclosure are explained by way of example on the basis of schematic drawings, without restricting the present disclosure, wherein:

FIG. 1 shows a schematic representation of an energy conversion device according to the present disclosure having a vertical rotor rotational axis on a rock face;

FIG. 2a shows a lateral view of an energy conversion device having a catching apparatus with a rectangular cross section;

FIG. 2b shows a front view of the energy conversion device according to FIG. 2a;

FIG. 2c shows a top view of the energy conversion device according to FIG. 2a;

FIG. 3a shows a lateral view of an energy conversion device having a catching apparatus with a round cross section;

FIG. 3b shows a front view of the energy conversion device according to FIG. 3a;

FIG. 3c shows a top view of the energy conversion device according to FIG. 3a;

FIGS. 11 to 22 show various schematic representations of energy conversion devices according to the present disclosure having different catching apparatuses;

FIG. 23b shows a lateral view of the energy conversion device according to FIG. 23a;

FIG. 23c shows a top view of the energy conversion device according to FIG. 23a;

FIG. 23d shows a perspective representation of the energy conversion device according to FIG. 23a.

DETAILED DESCRIPTION

Figure 4:
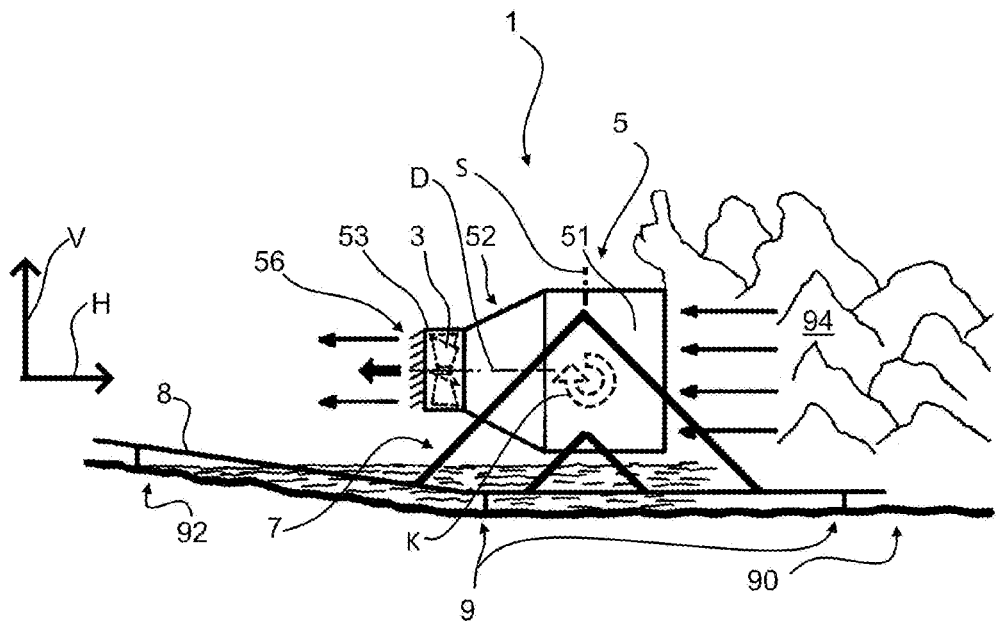
FIG. 4 shows a schematic representation of an energy conversion device according to the present disclosure having a horizontal rotor rotational axis on a strand shore.

According to at least one embodiment on an energy conversion apparatus, a flow housing comprises a catching apparatus upstream of a rotor mantle, which is adapted and arranged to guide a movement of water to the rotor. In some cases, the catching apparatus is stationary with respect to the rotor mantle. The rotor mantle and the catching apparatus can be formed in one piece. The catching apparatus can, for example, be funnel-like. With the aid of the rotor mantle and the catching apparatus, a forced flow through the rotor surface can be achieved. By guiding the movement of water to the rotor, a high yield of the energy conversion apparatus can be achieved.

In a further embodiment of the present disclosure, the catching apparatus extends like a channel, in some cases in a cylindrical or cuboidal manner, from the rotor mantle. Alternatively or additionally, the catching apparatus has a round, in some cases circular or elliptical, cross section or angular, in some cases polygonal, in some other cases square, cross section. The cross-sectional shape and/or channel extension of the catching apparatus in some cases is adapted to the local conditions of the energy conversion device. In some cases, the cross-sectional shape and/or channel extension can be adapted and arranged to guide and/or divert water from a prevailing direction of movement in order to align the rotor rotational axis. For example, the rotor rotational axis can be vertically aligned and the channel-like catching apparatus can extend obliquely from the rotor mantle in order to guide a surface wave movement toward the rotor.

Another further embodiment of the energy conversion device having a catching apparatus, which can be combined with the previous ones, provides that at least one, in some cases funnel-shaped, in some other cases continual or stepped, cross-sectional tapering is arranged at the end of the catching apparatus facing the rotor mantle. A stepped cross-sectional tapering can be produced in a simple and, therefore, inexpensive manner. A continual (step-free) cross-sectional tapering can be provided in order to produce a continual deflection of a flow. In some cases, the cross-sectional tapering is stationary with respect to the rotor mantle and/or the catching apparatus. The cross-sectional tapering has an inlet cross section and an outlet cross section. In some cases, the inlet cross section and the outlet cross section have the same cross-sectional shape. The inlet cross section is larger than the outlet cross section. In some cases, a diagonal extension of the inlet cross section is 1.1 to 10 times, in some other cases 1.5 to 5 times, in some even further cases approximately 2 times as large as a diagonal extension of the outlet cross section. In some cases, the cross-sectional tapering comprises an inflow opening formed by the catching apparatus, which is larger than the cross-sectional area of the rotor mantle. The speed of the water in the region of the rotor can be significantly increased by the cross-sectional tapering, compared to the speed in the surroundings of the energy conversion device, in some cases by at least 20%, in some other cases by at least 40%, in some even other cases by at least 60%. By increasing the water speed, a high yield can be achieved with the energy conversion unit according to the present disclosure.

Alternatively or additionally, in one further embodiment of an energy conversion device, the catching apparatus can comprise at least one manifold. In some cases, the manifold has an inner manifold wall and an outer manifold wall. The inner manifold wall is shorter than the outer manifold wall. In some cases, the inner manifold wall is rounded or angular. Alternatively or additionally, the outer manifold wall has a rounded or angular progression. In some cases, the manifold is adapted and arranged to deflect a flow of water from a first direction of movement at the inlet of the manifold into a second direction of movement. In some further cases, the manifold produces a deflection of the first direction of movement in the range of 30° to 180°, in some cases in the range of 45° to 135°, in some further cases in the range of 70° to 110°, in some even further cases in the range of 90°±10°. For example, an essentially horizontal flow movement can be converted into an essentially vertical flow movement with the manifold. In some cases, the catching apparatus comprises a manifold and a cross-sectional tapering. In some cases, a transition from the manifold to the cross-sectional tapering can be continual. In some cases, the manifold and the cross-sectional tapering have the same, for example round, in some cases oval or circular, or angular, in some other cases rectangular or polygonal, cross-sectional shape. The manifold and the cross-sectional tapering can be executed in a functional union, i.e., the catching apparatus can be formed by a manifold having an integrated cross-sectional tapering at least in sections. The cross-sectional tapering can be formed by inner and outer manifold walls aligned obliquely with one another. Alternatively, the manifold of the cross-sectional tapering can be upstream or downstream with respect to the direction of movement. The inner and the outer manifold walls can be aligned space parallel to one another. With the aid of a catching apparatus which is equipped with a manifold and/or a cross-sectional tapering, an energy conversion device having a high yield and a compact design can be achieved. The low material requirement during production, as well as low production and maintenance costs of the energy conversion device according to the present disclosure, advantageously further serve to protect resources. For example, it is possible to refrain from using rare metals.

In at least one embodiment, an energy conversion device according to the present disclosure comprises a mounting, on which a supporting frame is movably held transversely, in particular orthogonally, and/or parallel to the direction of the rotor rotational axis. The rotor is fixed to the supporting frame. In some cases, the mounting is a rail mounting. The supporting frame fixes the rotor and, therefore, the alignment of the rotor rotational axis. With the aid of the mounting, the supporting frame can be vertically movable, for example, in order to adapt the alignment of the rotor rotational axis to a prevailing water level, in some tidal height. In this case, the orientation of the rotor rotational axis can remain constant and a in some cases an exclusively translational movability in the vertical direction and/or horizontal direction can be provided with the aid of the mounting. Such an energy conversion device can be deployed, for example, on rocks, in some cases steep rock faces, and/or near the beach. In principle, it is conceivable to install or erect the energy conversion device according to the present disclosure in any location, for example on land.

In another embodiment of an energy conversion device, which can be combined with the previous ones, the rotor can be displaced in the vertical direction and/or in the horizontal direction, in some cases transversely, in some other cases orthogonally, or parallel to the rotor rotational axis, in some further cases between at least two rotor positions with parallel rotational axis alignments and/or relative to the supporting frame. The rotor can, for example, be displaced relative to the supporting frame in order to bring it, on the one hand, into an operating position in contact with the water and, on the other hand, into a resting and/or service position outside the water. Alternatively or additionally, the rotor can be displaceable in order to guarantee an adaptation to the prevailing flow and/or the prevailing water level.

Alternatively or additionally, in at least one embodiment of an energy conversion device, the rotor is movable in a swiveling manner transversely to the rotor rotational axis, in some cases about a vertical swiveling axis and/or in some other cases about a horizontal tilting axis. The rotor can be moved in a swiveling manner about several axes, for example about a swiveling axis and a tilting axis orthogonal thereto. The swiveling axis and/or the tilting axis are aligned transversely, in some cases orthogonally, with respect to the rotor rotational axis. In some cases, the rotor can be swiveled between at least two rotor orientations, in some cases relative to the supporting frame, for example by approximately 45° or approximately 80°. In some cases, the rotor can be rotated about the swiveling axis and/or about the tilting axis by at least 15°, in some cases at least 45°, in some other cases at least 60°, and/or by not more than 360°, in some cases not more than 180°, in some other not more than 120°. A rotor orientation can be determined on the basis of the angle alignment of the rotor rotational axis. For example, the rotor orientation can be pivoted about an essentially vertical swiveling axis, in order to be adaptable to prevailing flow conditions, for example on a beach. Alternatively or additionally, the rotor orientation can be pivoted about an essentially horizontal tilting axis, in order to be adaptable to a prevailing water level, for example a tidal height.

According to an expedient embodiment of the present disclosure, the energy conversion device comprises an actuating device which is adapted and arranged to adjust the rotor position and/or the rotor orientation. In some cases, the actuating device is mechanical, pneumatic, hydraulic and/or manual.

In another expedient embodiment of an energy conversion device according to the present disclosure, the rotor rotational axis is aligned in the horizontal direction. In some cases the alignment of the rotor rotational axis can be constantly aligned in the horizontal direction. The alignment of the rotor rotational axis can be fixed for a single determined horizontal direction. Alternatively, a movability of the rotor rotational axis with a constant horizontal alignment can be provided. For example, the rotor rotational axis can be movable in a translational manner with a constant horizontal alignment. Alternatively or additionally, the rotor rotational axis can be movable in a swiveling manner with a constant horizontal alignment, in some cases about a vertical swiveling axis.

According to another expedient embodiment of an energy conversion device, the rotor rotational axis is aligned in the vertical direction. In some cases, the energy conversion device is adapted and arranged to convert water energy from a waterfall or waves on a steep shore. The alignment of the rotor rotational axis can be directed vertically upward for a waterfall. When used on a steep shore, the alignment of the rotor rotational axis can be directed vertically downward. In some cases, the alignment of the rotor rotational axis can be constantly aligned in the vertical direction. The alignment of the rotor rotational axis can be fixed for a single determined vertical direction. Alternatively, a movability of the rotor rotational axis with a constant vertical alignment can be provided. For example, the rotor rotational axis can be movable in a translational manner with a constant vertical alignment.

In at least one embodiment of an energy conversion device, the flow housing can in some cases comprise at least one sail which, at least in sections, forms a surface of the flow housing, in some cases of the catching apparatus, in some other cases of a, in particular funnel-shaped, cross-sectional tapering and/or of the rotor mantle. In some cases, the flow housing can be formed from one or more sails. Such an embodiment can be implemented in an inexpensive manner.

In one other embodiment of an energy conversion device according to the present disclosure, the energy conversion device comprises a float such as a boat, ship, barge, pontoon, a buoy, an oil drilling platform or the like, to which a supporting frame, to which the rotor is fixed, is fastened. In some cases, the supporting frame fastened to the float can be executed like the supporting frame described above.

According to another embodiment of an energy conversion device, a supporting frame is provided, to which the rotor is fixed. The supporting frame is fastened to a foundation on the bottom, such as a seabed, a shore, a steep bank, a rock face or a rock bed. It is clear that this embodiment can be combined with the aforementioned embodiment which includes a mounting, in some cases a rail mounting.

In an expedient embodiment of the energy conversion device, a supporting frame of the energy conversion device is fastened to a dam wall, such as a dam, a weir, a hydroelectric power plant or the like. The rotor is fixed to the supporting frame. The energy conversion device is suitable, for example, for equipping or retrofitting existing dam walls of any kind.

According to an embodiment of an energy conversion device, which can be combined with the previous ones, a plurality of rotors arranged behind one another, in some cases having coaxial rotor rotational axes, in some other cases a single coaxial rotor rotational axis, is provided. Alternatively or additionally, the plurality of rotors arranged behind one another can be connected to the same rotor shaft, in some cases in order to drive the same generator(s) in order to generate electric energy. The plurality of rotors can be similar or different, for example have variously shaped rotor blades, different rotor blade numbers, different rotor diameters and the like. Several or all of the plurality of rotors can be housed in the same rotor mantle.

Additionally or alternatively, an embodiment of an energy conversion device, which can be combined with the previous ones, can comprise at least one retaining apparatus, arranged in some cases behind the rotor. The retaining apparatus can be formed, for example, as an individual retaining flap or several retaining flaps. The retaining apparatus, in some cases the retaining flap, is adapted and arranged to allow a flow of water in a first direction through the flow housing, and to prevent a flow of water in a second direction opposite to the first direction. In this way, it can be guaranteed that water flows towards the rotor exclusively in a single predetermined direction of movement.

The present disclosure also relates to an energy conversion arrangement which comprises several (i.e., a plurality of) energy conversion devices. According to an expedient embodiment, the several energy conversion devices are arranged at least partially behind one another, in some cases parallel to the rotational axis. Alternatively or additionally, the several energy conversion devices can be arranged at least partially above one another and/or next to one another, in some cases parallel to the rotational axis. By using several energy conversion devices in combination with one another, a high yield of electric energy from water energy can be extracted at suitable locations.

Turning now to the drawings and for ease of reading, the same or similar reference numerals are used for the same or similar components in various embodiments in the following description of embodiments of the present disclosure.

The energy conversion device 1 is adapted and arranged according to the present disclosure to convert water energy into electric energy. An energy conversion device 1 according to the present disclosure comprises, as main components, a rotor 3 and a flow housing 5, in which the rotor 3 is housed. The rotor 3 has a rotor rotational axis D, the alignment of which is fixed with respect to, for example, the horizontal H and the vertical V. For this purpose, the rotor 3 can be held, for example, by a supporting frame 7. The flow housing 5 is equipped with a rotor mantle 53 which surrounds the rotor 3 radially to the rotor rotational axis D.

FIG. 1 shows an energy conversion device 1 on a rock face 93. The rock face 93 extends essentially in the vertical direction V. On the rock face 93, a foundation 9 is provided, to which a supporting frame 7 of the energy conversion device 1 is anchored.

The rotor 3 is fixed, in the embodiment shown in FIG. 1, with a rotor rotational axis D oriented in the vertical direction V. The configuration of the rotor 3 is such that water moving in the vertical direction V upward through the rotor mantle 53 flows into it and drives it. In order to feed the waves 94 to the rotor 3 and to deflect the movement of the water into an essentially vertically upwardly directed direction of movement, the flow housing 5 is adapted and arranged upstream of the rotor mantle 53. To this end, the flow housing 5 is equipped with a catching apparatus 51. The catching apparatus 51 is composed of a manifold 57 and a funnel-shaped cross-sectional tapering 52. The catching apparatus 51, i.e., the manifold 57 and the cross-sectional tapering 52, as well as the rotor mantle 53 are fastened to the supporting frame 7 rigidly and in a stationary manner relative to one another. The flow housing 5 can, for example, be embodied like the one described below with respect to FIGS. 2a to 2c. Downstream of the rotor mantle 53, a retaining apparatus, which is not shown in greater detail, for example a retaining flap, can be provided, which allows water to move upward in the vertical direction V through the flow housing 5 and which prevents water from flowing downward in the vertical direction V through the flow housing 5.

The supporting frame 7 is equipped with a rail mounting 8. The rail mounting 8 enables the energy conversion device 1 to be moved in the vertical direction V. Depending on the currently prevailing tidal height, the position of the energy conversion device 1 and in some cases, the rotor position can be adjusted with the aid of the mounting 8 in order to optimally capture the energy of the waves 94, for example depending on the tidal height and/or the prevailing waves. In an exemplary embodiment, the rotor orientation, i.e., the alignment of the rotor rotational axis D, is constantly fixed in accordance with the vertical direction V. Alternatively, the energy conversion device can be swiveled about a first horizontal swiveling axis S and/or a second horizontal tilting axis (in the direction of the drawing plane) in order to be adjustable to a prevailing flow direction.

FIGS. 2a to 2c show various views of the flow housing 5 of an energy conversion device 1. The rotor mantle 53 has a circular cross section. The manifold 57 of the catching apparatus 51 has a square cross section. The cross-sectional tapering 52 is funnel-shaped and has the same square cross section as the manifold 57 at the inlet and the same circular cross section as the rotor mantle 53 at the outlet. The rectangular cross section of the manifold 57 is offset by approximately 60° on the outlet side (in the direction of the rotor 3) in relation to the rectangular cross section 54 of the manifold 57 on the inlet side (facing the waves 94). The manifold 57 produces a deflection of the direction of movement of the water starting from the horizontal direction H of the waves 94 into an essentially vertical, upwardly directed direction V by approximately 90°.

FIGS. 3a to 3c show an alternative configuration of a flow housing 5 for an energy conversion device 1. The flow housing 5 shown in FIGS. 3a to 3c differs essentially from the flow housing 5 described above with respect to FIGS. 2a to 2c essentially only in the continually circular cross section 55. In other respects, reference is made to the previous embodiments.

As shown in FIGS. 2a to 3c, a swiveling axis S and a tilting axis K orthogonal thereto can be provided, relative to which the flow housing 5 can be moved in a swiveling manner. An actuating device, which is not shown in greater detail, which can be actuated, for example, mechanically, pneumatically, hydraulically or manually, can produce an alignment of the flow housing 5 with respect to the tilting and/or swiveling axis K, S.

FIG. 4 shows another embodiment of an energy conversion device 1 according to the present disclosure, which is arranged on a flat beach 92. Similarly to the embodiments described above with respect to FIG. 1, a rail mounting 8 is provided, which is anchored with a foundation 9 to the seabed 90 or beach 92. The supporting frame 7 can be moved along the rail mounting 8, for example to transport the energy conversion device 1 in accordance with a prevailing tidal height and/or in accordance with prevailing waves 94 into an optimal rotor position. The rail mounting 8 has an inclination such that, during the movement of the supporting frame 7 along the rail mounting 8, the rotor position is displaced in the vertical direction V and the horizontal direction H. It can additionally be provided that the flow housing 5 can be pivoted about a vertical swiveling axis S and/or a horizontal tilting axis K (oriented in the direction of the blade plane) in order to be able to achieve an optimal rotor orientation.

In the embodiment shown in FIG. 4, the flow housing 5 is formed by rotor mantles 53 which are coaxial with regard to the rotor rotational axis D, a circular funnel-shaped cross-sectional tapering 52 and a catching apparatus 51 like a cylindrical channel. In the rear outlet of the rotor mantle 53, several retaining flaps 56 are arranged, which are adapted and arranged to allow a flow through the flow housing 5 only in a predetermined direction of movement in accordance with the rotor rotational axis D, but not in the opposite direction.

Figure 5:
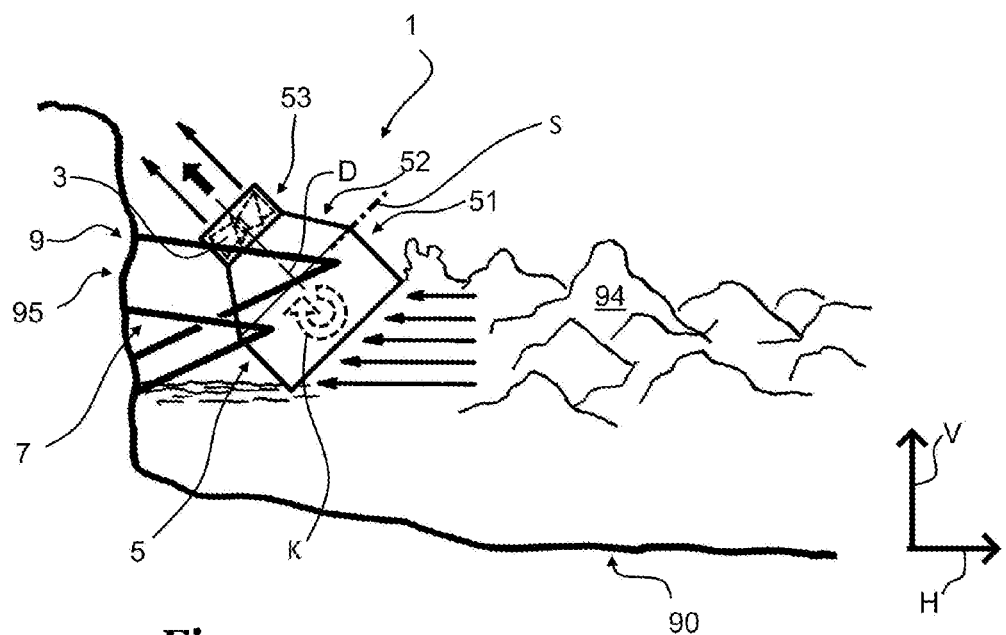
FIG. 5 shows a schematic representation of an energy conversion device according to the present disclosure having an oblique rotor rotational axis on a steep shore.

FIG. 5 shows another embodiment in which the energy conversion device 1 is fastened to a steep shore 95. In contrast to the embodiments according to FIGS. 1 and 4, the supporting frame 7 is anchored immovably with a foundation 9 to a steep shore 95. The rotor rotational axis D is oblique, aligned at an angle of approximately 45° with respect to the horizontal H and the vertical V. In an actuating device, which is not shown in greater detail, it can be provided that the rotor 3 is aligned together with the flow housing 5 relative to the supporting frame 7, for example to pivot about a horizontal tilting axis K (running in the direction of the blade plane). Additionally or alternatively, an actuating device can be provided, which allows the rotor 3, together with the flow housing 5, to pivot about a swiveling axis S which is aligned perpendicularly to the rotor rotational axis D as well as, optionally, to the tilting axis K. The shape of the flow housing 5 can essentially correspond to that previously described with regard to the embodiment shown in FIG. 4.

Figure 6:
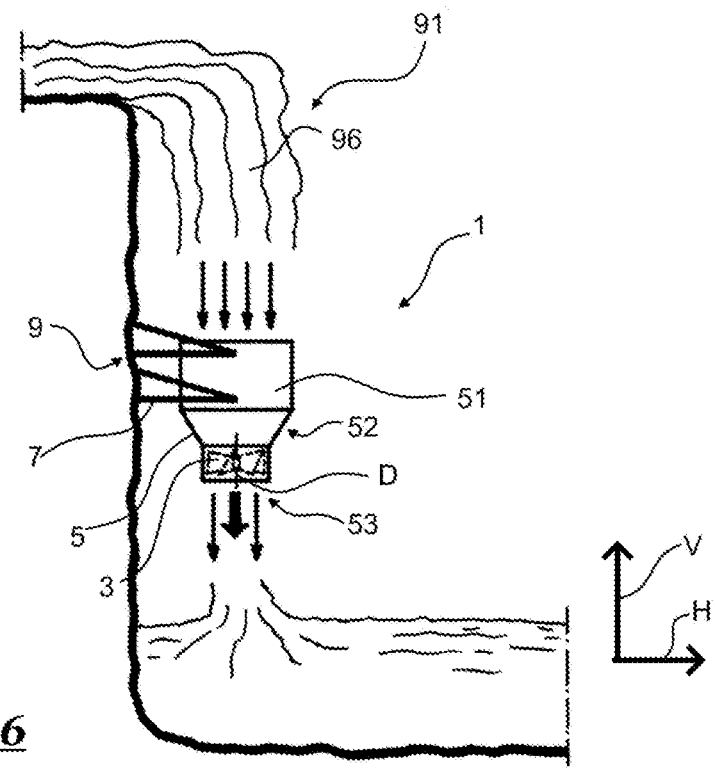
FIG. 6 shows a schematic representation of an energy conversion device according to the present disclosure having a vertical rotor rotational axis in a waterfall.

FIG. 6 shows a further embodiment of an energy conversion device 1, in which the energy conversion device 1 is fastened to a rock face 93 in order to extract water energy from the flow of water 96 of a waterfall 91. The rotor rotational axis D is aligned vertically V downward. The rotor 3 and the flow housing 5 are rigidly fastened to a supporting frame 7 which is anchored with a foundation 9 in a stationary manner to the rock face 93. The shape of the flow housing 5 can correspond to that shown in FIG. 4.

Figure 7:
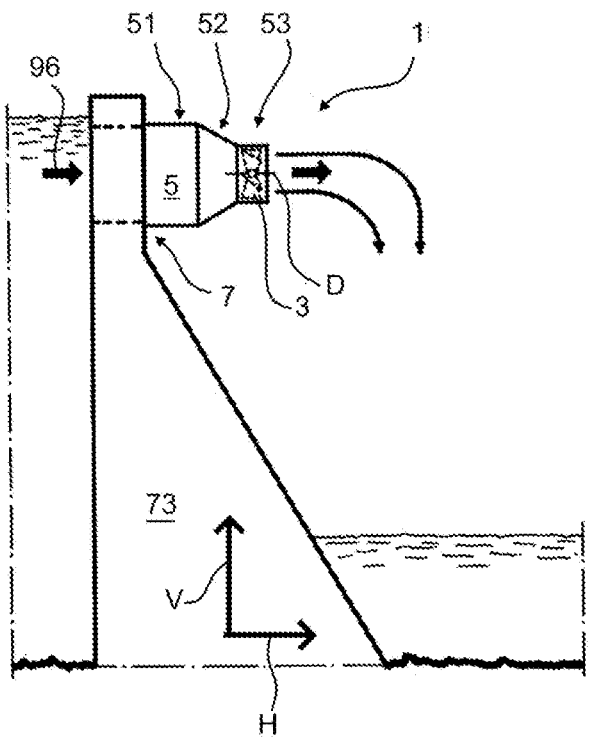
FIG. 7 shows a schematic representation of an energy conversion device according to the present disclosure having a horizontal rotor rotational axis on a dam wall.

FIG. 7 shows an embodiment of an energy conversion device 1 which is fastened to a dam wall 73 in order to convert water energy of a flow of water 96 from a reservoir into electric energy. The rotor rotational axis D is aligned in the horizontal direction H. The dam wall 73 acts in a functional union as a supporting frame 7 which carries the flow housing 5 and fixes the rotational axis D of the rotor 3. The shape of the flow housing 5 can correspond to that shown in FIG. 4.

Figure 8:
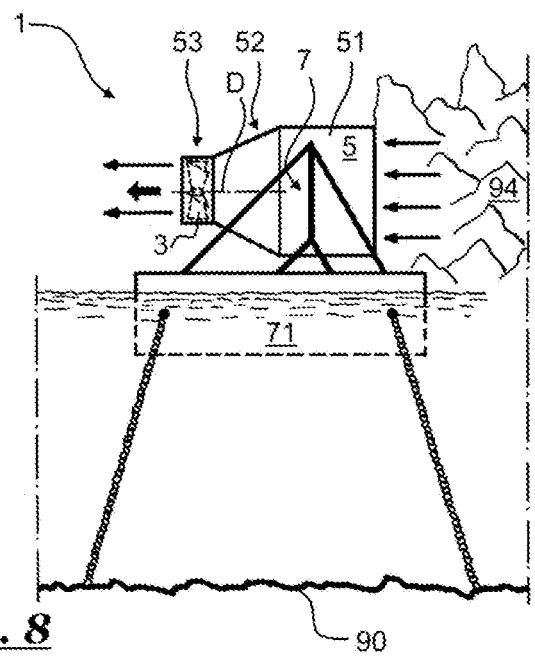
FIG. 8 shows a schematic representation of an energy conversion device according to the present disclosure having a horizontal rotor rotational axis on a float.

FIG. 8 shows an energy conversion device 1, which is carried on a float 71, which is anchored with chains to the bottom 90 of the sea or another body of water. A supporting frame 7 is provided on the float 71, which supporting frame carries the flow housing 5 and the rotor 3. Waves 94 on the surface of the body of water are guided through the flow housing 5 to the rotor 3 in order to drive the latter and to thus extract electric energy with the aid of a generator driven by the rotor 3, which is not shown in greater detail. The shape of the flow housing 5 can correspond to that shown with respect to FIG. 4.

Figure 9:
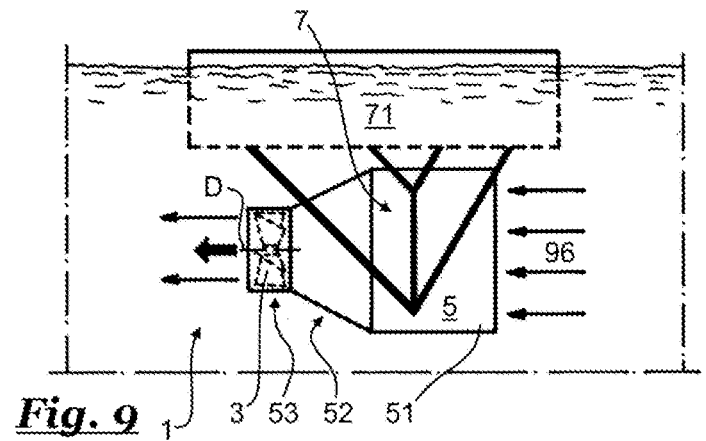
FIG. 9 shows a schematic representation of an energy conversion device according to the present disclosure having a horizontal rotor rotational axis under a float.

FIG. 9 shows an energy conversion device 1 which is carried below a float 71 by the latter in order to convert water energy from a flow 96 in the body of water into electric energy. The shape of the flow housing 5 can correspond to that shown in FIG. 4. A large volume of water can be collected with the aid of the flow housing 5, and fed to the rotor 3 with the aid of the funnel-shaped cross-sectional tapering 52. The flow rate accelerates so that the yield can be increased.

Figure 10:
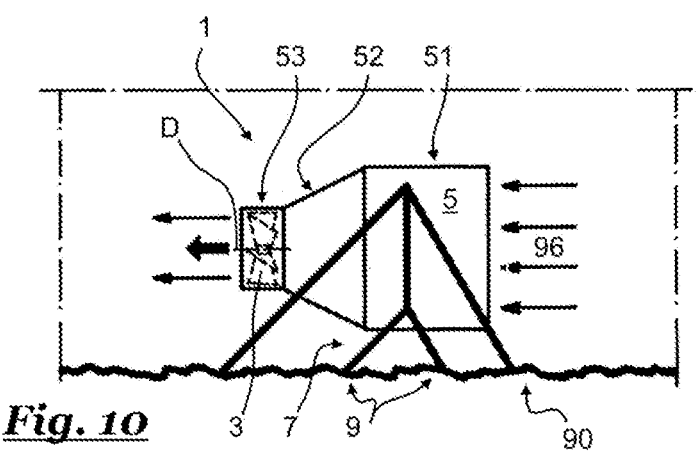
FIG. 10 shows a schematic representation of an energy conversion device according to the present disclosure having a horizontal rotor rotational axis at the bottom of a body of water.
Figure 23A:
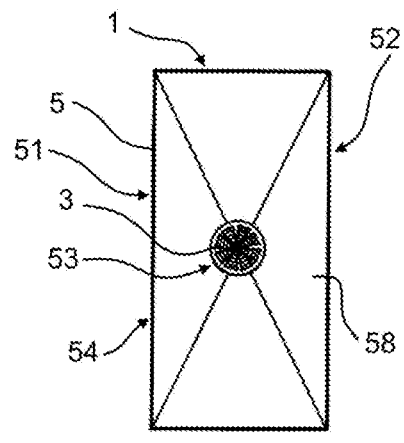
FIG. 23a shows a front view of an energy conversion device according to the present disclosure, the rectangular catching apparatus of which is formed by a sail.
Figure 23B:
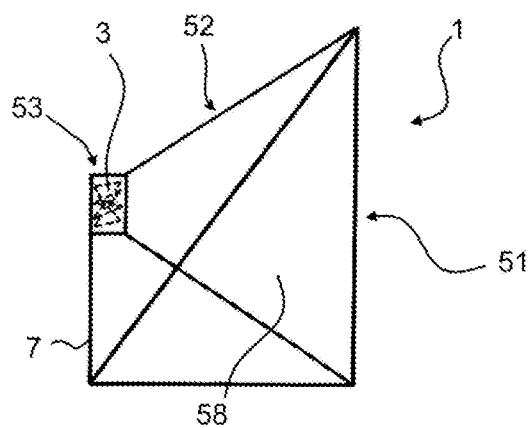
Figure 23C:
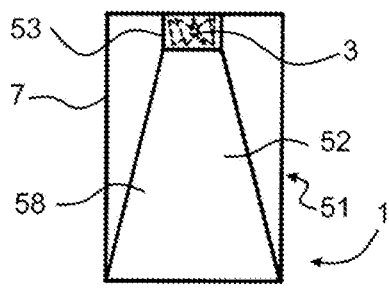
Figure 23D:
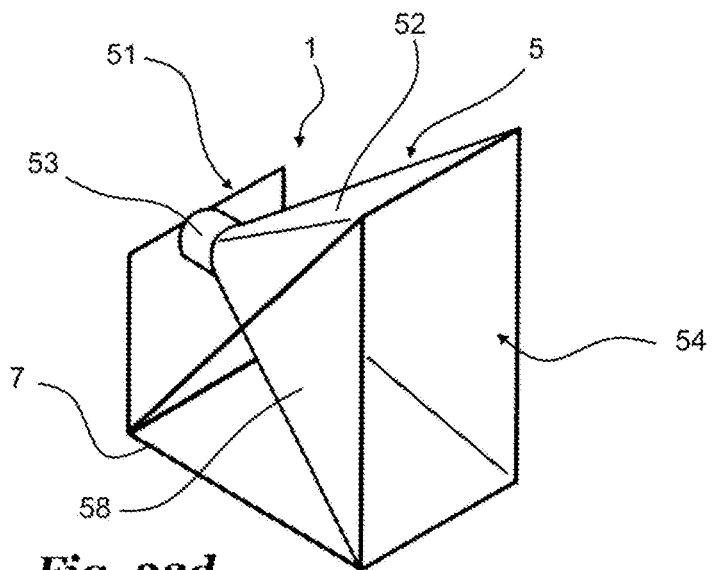

In the embodiment shown in FIG. 10, the supporting frame 7 is fastened with a foundation 9 to the bottom 90 of the water. Like the embodiment shown in FIG. 9, the energy conversion device 1 shown in FIG. 10 also serves to convert water energy from a flow 96 of the body of water, for example an ocean current or the flow of a river, into electric energy. The shape of the flow housing 5 can correspond to that shown n FIG. 4.

FIGS. 11 to 22 show a plurality of various configurations for flow housings 5 of various energy conversion devices 1 according to the present disclosure. The ideal flow housing configuration can be selected depending on the local conditions. The selection of the flow housing configuration can also be made from an economic point of view, for example in terms of a simple and, therefore, inexpensive production and/or assembly. The cross-sectional shape is not shown in detail. It is clear that the flow housing 5 can be of various shapes, for example it can be shaped, at least in certain sections or completely, with a round, in some cases circular or elliptical, cross section, or with, at least in certain sections or completely, an angular, in some cases rectangular, in some other cases square, or polygonal, cross section. The water inlet direction is identified with a thick, black arrow.

FIG. 11 shows an energy conversion device 1 having a catching apparatus 51 which has a larger cross-sectional width than the diagonal of the rotor mantle 53. The step-like transition between the catching apparatus 51 and the rotor mantle 53 forms a cross-sectional tapering 52 which produces a forced flow through the rotor 3 with an increased flow rate. This applies equally to the embodiment according to FIG. 13. The energy conversion devices 1 in FIGS. 11 and 13 essentially only differ in that, in the embodiment according to FIG. 13, the rotor mantle 53 is arranged coaxially and centrally at the outlet of the catching apparatus 51 of the flow housing 5, whereas the rotor mantle 53 is arranged axially parallel, but unsymmetrically offset at the outlet of the flow housing 5 shown in FIG. 11. In some embodiments, an alternative configuration having another water inlet direction is shown in accordance with a dashed arrow. In these alternative embodiments, the flow housing 5 also has a manifold 57.

FIG. 12 shows an energy conversion device without a cross-sectional tapering, in which the cross-sectional width of the catching apparatus 51 corresponds to the diagonal of the rotor mantle 53.

FIG. 14 shows an energy conversion device 1, in which the flow housing 5 essentially only consists of a funnel-shaped cross-sectional tapering 52 which forms the catching apparatus 51 in a functional union. In contrast thereto, in the embodiment according to FIG. 15, a channel-like catching apparatus 51 is upstream of the funnel-shaped cross-sectional tapering 52. The embodiment according to FIG. 16 differs from the energy conversion device 1 shown in FIG. 14 in that the funnel-shaped cross-sectional tapering 52 is asymmetrical.

The energy conversion devices 1, which are shown in FIGS. 17 to 22, have flow housings 5 having various manifolds 57 and different cross-sectional constrictions 52. The manifolds 57 are each composed of an inner manifold wall 57i and an outer manifold wall 57a. In the case of the energy conversion devices 1 according to FIGS. 19 and 21, both the inner manifold wall 57i and the outer manifold wall 57a are continually shaped in a curved manner in an arc shape.

The cross-sectional tapering 52 of the energy conversion device 1 according to FIG. 19 is formed in a functional union by the manifold 57. In the case of the energy conversion device 1 according to FIG. 20 as well as those according to FIG. 21 and FIG. 22, a funnel-shaped cross-sectional tapering 52 is arranged between the manifold 57 and the rotor mantle 53.

The energy conversion device 1 according to FIG. 18 has a straight inner manifold wall 57i and a continual outer manifold wall 57a running in the form of a quarter-circular arc. The energy conversion devices 1 according to FIGS. 17 and 20 each have an outer manifold wall 57a which is shaped with angles. In the case of the energy conversion devices 1 of FIGS. 17 and 18, the cross-sectional tapering 52 is formed as previously described with respect to FIG. 11.

The manifold 57 according to FIG. 22 is formed in that the inner manifold wall 57i is shorter than the outer manifold wall 57a. The inner manifold wall 57i and the outer manifold wall 57a are essentially aligned parallel to one another. However, the different lengths result in another alignment of the inlet cross section compared to the outlet cross section.

It is clear that, instead of the flow housing configurations described above with respect to FIGS. 1 and 4 to 10, another flow housing configuration can be deployed, in some cases one according to one of FIGS. 11 to 22.

FIGS. 23a to 23d show an energy conversion device 1 for converting water energy into electric energy, in which the flow housing 5 is formed by a sail 58. The sail 58 can be supported by a plurality of struts which form the supporting frame 7 in the manner of a truss. The supporting frame 7 having the sail 58 can, for example, be provided as a kit in order to provide an energy conversion device 1 in a simple and inexpensive manner. A flow housing 5 is formed by the sail or sails 58, which flow housing forms a catching apparatus 51 having a rectangular cross section 54, which immediately forms a funnel-shaped cross-sectional tapering 52 toward a cylindrical rotor mantle 53. The rotor mantle 53 can likewise be realized by a sail 58.

Figure 24:
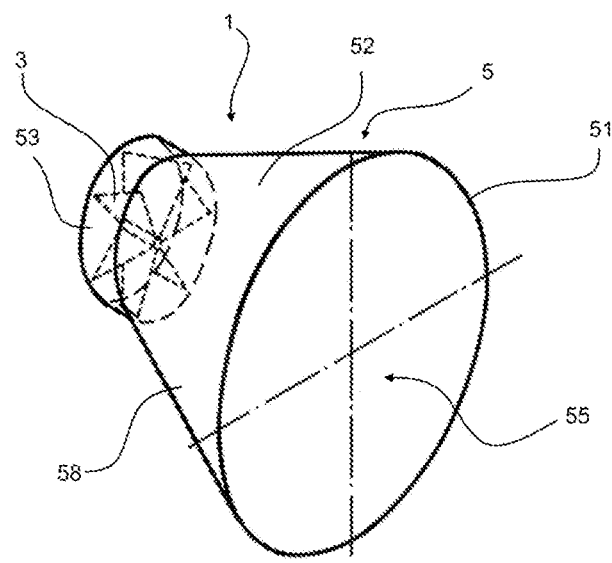
FIG. 24 shows a perspective representation of an energy conversion device according to the present disclosure, the round catching apparatus of which is formed by a sail.

FIG. 24 shows another embodiment of an energy conversion device 1, in which the flow housing 5 is formed by a sail 58, but with the difference that the inlet of the catching apparatus 51 and the funnel-shaped cross-sectional tapering 52 have a round cross section 55.

The features of the present disclosure disclosed in the preceding description, the claims as well as the drawings can be essential, both individually and in any combination, for the realization of the present disclosure in its various embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

LIST OF REFERENCE NUMERALS

1 Energy conversion device
3 Rotor
5 Flow housing
7 Supporting frame
8 Rail mounting
9 Foundation
51 Catching apparatus
52 Cross-sectional tapering
53 Rotor mantle
54 Angular cross section
55 Round cross section
56 Retaining flap or valve
57 Manifold
57i Inner manifold wall
57a Outer manifold wall
58 Sail
71 Float
73 Dam wall
90 Seabed
91 Waterfall
92 Beach or shore
93 Rock face
94 Waves
95 Steep shore or bank
96 Flow of water
D Rotational axis
H Horizontal direction
K Tilting axis
V Vertical direction
S Swiveling axis

The invention claimed is:

1. An energy conversion device for converting water energy into electric energy, comprising:
   at least one rotor having a rotor rotational axis that is fixed; and
   a flow housing which comprises a rotor mantle which surrounds the at least one rotor radially to the rotor rotational axis,
   wherein the flow housing comprises a catching apparatus upstream of the rotor mantle, which is adapted and arranged to guide a movement of water to the at least one rotor,
   wherein at least one cross-sectional tapering is arranged at an end of the catching apparatus facing the rotor mantle,
   wherein the catching apparatus comprises at least one manifold, and
   wherein the at least one manifold is located upstream of the cross-sectional tapering with respect to a direction of movement of the water,
   the energy conversion device further comprising:
   a supporting frame, wherein an alignment/orientation of the rotor rotational axis is determined by the supporting frame, and
   a mounting on which the supporting frame is movably held transversely and/or parallel to a direction of the rotor rotational axis,
   wherein the at least one manifold is adapted and arranged to deflect a flow of the water from a first direction of movement at an inlet of the at least one manifold into a second direction of movement,
   wherein the at least one manifold produces a deflection of the first direction of movement in the range of 45° to 135°, and
   wherein the supporting frame is movably held parallel to the direction of the rotor rotational axis in order to adjust the alignment/orientation of the rotor rotational axis to a prevailing water level.

2. The energy conversion device according to claim 1, wherein the catching apparatus extends channel-like from the rotor mantle.

3. The energy conversion device according to claim 1, wherein the catching apparatus has a round cross section or angular cross section.

4. The energy conversion device according to claim 1, wherein the at least one rotor is displaceable in a vertical direction and/or in a horizontal direction.

5. The energy conversion device according to claim 4, further comprising at least one actuating device which is adapted and arranged to adjust a position and/or orientation of the at least one rotor.

6. The energy conversion device according to claim 1, wherein the at least one rotor is movable in a swiveling manner transversely to the rotor rotational axis.

7. The energy conversion device according to claim 1, wherein the rotor rotational axis is aligned in a horizontal direction or the rotor rotational axis is aligned in a vertical direction.

8. The energy conversion device according to claim 1, further comprising a float to which the supporting frame, to which the at least one rotor is fixed, is fastened.

9. The energy conversion device according to claim 1, wherein the supporting frame, to which the at least one rotor is fixed, is fastened to a foundation on the bottom of a body of water.

10. The energy conversion device according to claim 1, wherein the supporting frame, to which the at least one rotor is fixed, is fastened to a dam wall.

11. The energy conversion device according to claim 1, further comprising a plurality of rotors arranged behind one another.

12. The energy conversion device according to claim 11, wherein the plurality of rotors have coaxial rotor rotational axes and/or are connected to the same rotor shaft.

13. The energy conversion device according to claim 1, further comprising at least one retaining apparatus which is adapted and arranged to allow the flow of the water in a first direction through the flow housing, and to prevent the flow of the water in a second direction opposite to the first direction.

14. The energy conversion device according to claim 13, wherein the at least one retaining apparatus is arranged behind the at least one rotor.

15. The energy conversion device according to claim 1, wherein at least one cross-sectional tapering is funnel shaped.

16. The energy conversion device according to claim 1, wherein the at least one manifold has an inner manifold wall and an outer manifold wall, wherein the inner manifold wall is shorter than the outer manifold wall, and wherein the inner manifold wall has a rounded or angular progression and/or wherein the outer manifold wall has a rounded or angular progression.

17. The energy conversion device of claim 1, wherein the at least one manifold produces a deflection of the first direction of movement in the range of $90°\pm10°$.

18. An energy conversion arrangement comprising a plurality of energy conversion devices according to claim 1.

19. The energy conversion arrangement according to claim 18, wherein the plurality of energy conversion devices are arranged behind one another and/or the plurality of energy conversion devices are arranged above one another and/or next to one another.

20. The energy conversion arrangement according to claim 19, wherein the plurality of energy conversion devices are arranged behind one another and parallel to the rotor rotational axis, and/or next to one another and parallel to the rotor rotational axis.

* * * * *